Oct. 1, 1929.  A. C. FISCHER  1,730,068

RAIL FILLER

Filed July 13, 1927

Albert C. Fischer
Inventor

Patented Oct. 1, 1929

1,730,068

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

RAIL FILLER

Application filed July 13, 1927. Serial No. 205,518.

My invention relates to rail fillers wherein the major portion of the rail filler is composed of an earthy material which readily adapts itself to a putty-like condition when mixed with oil. Such earthy material being, for instance, clay, shales, infusorial earth and fuller's earth. I mix any of these earthy materials, or any desired combination of them, with suitable vegetable, mineral or animal oils, in such proportions as to make the earthy material ductile and workable.

Figure 1:
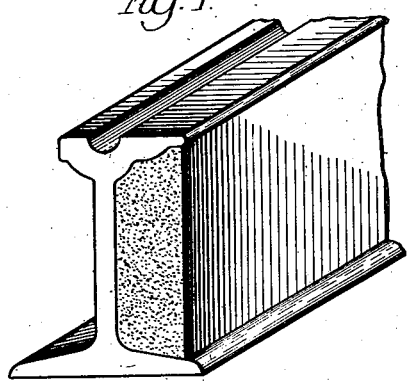

In the illustrative embodiment of my invention Figure 1 illustrates my improved rail filler formed of any earthy substance, such as clay, treated with an oil, such as a non-drying oil.

Figure 2:
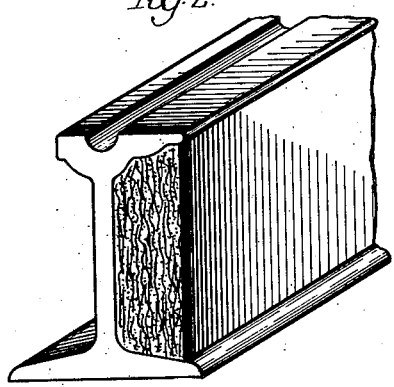
Figure 3:
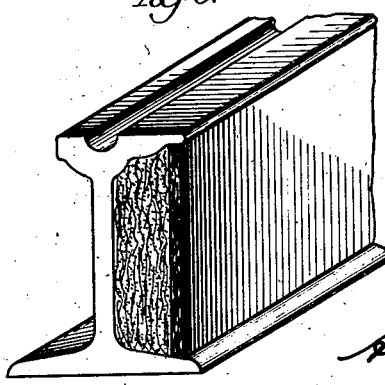

Figure 2 is a modification thereof, wherein the earthy substance has mineral fibres incorporated therein, and Figure 3 is still another modification wherein the sides of the rail filler are coated with a layer of waterproofing substance, preferably having linear fibres incorporated therein.

In this illustrative embodiment of my invention I show the rail filler as composed of clay mixed with oil, such as, cotton seed, castor oil, fish oils or the like, and I preferably use those which are slow-drying or non-drying. A suitable mixture to be produced consists approximately of seventy-five (75) per cent clay, preferably in a ground, pulverized state, and approximately twenty-five (25) per cent oil. However, a stiffer material can be prepared by using a mixture of approximately eighty-five (85) per cent clay and about fifteen (15) per cent oil, or another mixture may be prepared containing approximately ninety-five (95) per cent clay and five (5) per cent oil, depending entirely upon the nature of the oil used and the degree of plasticity required in the mixture. After a thorough mixing of these ingredients the bulk material may be pressed between suitable rolls and formed into sheets of any desired thickness, and may then be cut in strips by proper slitting machinery. all of which is now on the market and in use for pressing and slitting materials prepared from bituminous mixtures.

My improved rail filler is made more effective by incorporating fibrous material in various quantities in the earthy material. This fibrous material may be mixed with various other ingredients, such as oil or soap, or in fact anything that will aid in assuring the toughness of the material, or the material may be incorporated dry.

The fibrous material which I desire to use, and which assists in not only reinforcing the rail filler but also providing expansive qualities and sound deadening characteristics, may consist of excelsior or excelsior ribbon, broom corn, straw, hair, asbestos fibre and vegetable fibre, among which are wood fibres and animal fibres. In fact I may use practically any fibres which have considerable length as distinguished from finely ground fillers which have no length, and therefore have no interlocking, interlacing or reinforcing qualities. These linear fibres which I use are primarily for the purpose of binding the earthy materials together so that the rail filler may be more readily handled without breaking; in some instances I desire to use cocoanut fibres, hemp, flax, or sisal homogeneously incorporated together in the filler. The cocoanut fibres are very long, are tough, and are comparatively fine and attenuated whereas the hemp, flax or sisal fibres provide long vegetable filling medium which has a more pronounced and thicker compressible bottom. The cocoanut fibres when used in combination with the hemp, flax, or sisal fibres, serve to inter-twine with these latter fibres and more firmly bind the linear fibres in the filler.

It is to be understood that I do not wish to be limited to the nature of the earthy material employed, or to the nature of the oil, or to the nature of the fibre used. Likewise the sides of the rail filler may be provided or treated with a suitable coating or a suitable layer of waterproofing material, which, if desired, may have incorporated in it linear fibres, as illustrated in Figures 2 and 3.

One of the waterproofing materials which I desire to avail myself of is bituminous material. The function of the waterproofing material is to enable the rail filler to adhere to the concrete and also impart toughness to the rail filler.

My invention also comprehends a rail filler of the character herein set forth, having its sides reinforced with layers of felt saturated with asphalt or the like.

I find that the oil mixed with the earthy material, such for instance as clay, makes the clay waterproof and also plastic; that the fibrous material imparts strength to the mass and makes it easier to handle without breakage, and also increases its sound deadening qualities. It is preferable that the clay be ground to a very fine consistency before incorporating the oil with the clay.

I claim:

1. A rail filler comprising a preformed strip of earthy material having sufficient oil mixed therewith to add plasticity to the strip.

2. A rail filler comprising a preformed strip of clay, having sufficient oil mixed therewith to add plasticity to the strip.

3. A rail filler comprising a preformed strip of earthy material, having linear fibrous elements incorporated therein, said earthy material having sufficient oil mixed therewith to add plasticity to the strip.

4. A rail filler composed of earthy substances and a non-drying oil.

5. A rail filler composed of earthy substances mixed with oil, prepared in sheet form and having its sides protected by a waterproofing substance.

6. A rail filler composed of earthy material mixed with oil, prepared in sheet form, and having on its sides a layer of bituminous material.

7. A rail filler composed of clay mixed with oil, prepared in sheet form and having on its sides a layer of bituminous material mixed with fibrous matter.

8. A rail filler consisting of earthy material mixed with oil, having a facing layer of fibrous material and waterproofing substance.

9. A rail filler consisting of clay mixed with oil, having fibrous material incorporated therein, formed in sheet form, and having its sides coated with bituminous material.

10. A preformed rail filler composed of a composition in which clay is included as an ingredient.

11. A preformed rail filler composed of clay composition having long strengthening fibres homogeneously incorporated therein.

12. A preformed rail filler consisting of clay composition having relatively long vegetable fibres homogeneously incorporated therein.

13. A preformed rail filler comprising clay having linear filling elements therein of vegetable nature, said filling elements including cocoanut fibres and including thicker vegetable filling elements of pronounced compressibility.

14. A preformed rail filler comprising an earthy binder of waterproof nature having cocoanut fibres and sisal fibres homogeneously incorporated therein.

Signed at Chicago, Illinois, this 18th day of June, 1927.

ALBERT C. FISCHER.